United States Patent
Usuda et al.

(10) Patent No.: US 7,630,733 B2
(45) Date of Patent: Dec. 8, 2009

(54) TRANSMISSION RATE CONTROL METHOD, MOBILE STATION, AND RADIO NETWORK CONTROLLER

(75) Inventors: Masafumi Usuda, Yokosuka (JP); Anil Umesh, Yokohama (JP); Takehiro Nakamura, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 519 days.

(21) Appl. No.: 11/307,952

(22) Filed: Feb. 28, 2006

(65) Prior Publication Data

US 2006/0209692 A1    Sep. 21, 2006

(30) Foreign Application Priority Data

Feb. 28, 2005    (JP)    ............ P2005-055131

(51) Int. Cl.
  *H04B 7/00*    (2006.01)
(52) U.S. Cl. ............................ 455/522; 370/232
(58) Field of Classification Search .......... 455/442, 455/522, 436, 453; 370/232
See application file for complete search history.

(56) References Cited

U.S. PATENT DOCUMENTS

| | | | |
|---|---|---|---|
| 5,923,650 A * | 7/1999 | Chen et al. .................. | 370/331 |
| 6,148,209 A | 11/2000 | Hamalainen et al. | |
| 2002/0147020 A1 | 10/2002 | Iguchi et al. | |
| 2008/0125134 A1* | 5/2008 | Usuda et al. ............. | 455/452.1 |

FOREIGN PATENT DOCUMENTS

| | | |
|---|---|---|
| WO | 2004/014097 A1 * | 2/2004 |
| WO | WO 2004/014097 A1 | 2/2004 |
| WO | WO 2004-102862 A2 | 11/2004 |

OTHER PUBLICATIONS

TSG-RAN Working Gourp 1 # Relese-6 AdHoc Meeting TSGR1(04)0773; Cannes, France Jun. 21-24, 2004; Source: NTT DoCoMo; Title: Cell level rate control and autonomous . . . .
Samsung, "EUL Scheduling: signalling support", 3GPP TSG RAN WG1 #38bis, Seoul, Korea, Sep. 20-24, 2004, XP-002366790, Tdoc R1-041084, pp. 1-6.
Search report issued on Jun. 7, 2006 in the counterpart European application.

* cited by examiner

*Primary Examiner*—Duc Nguyen
*Assistant Examiner*—Angelica M Perez
(74) *Attorney, Agent, or Firm*—Marvin A. Motsenbocker; Mots Law, PLLC

(57) ABSTRACT

A transmission rate control method of this invention includes: notifying, at a radio base station Node B, a mobile station UE of a maximum allowable transmission rate of uplink user data, using an absolute rate grant channel (E-AGCH); instructing, at a radio network controller RNC, the mobile station UE to reduce the maximum allowable transmission rate by layer-3 signaling; and reducing, at the mobile station UE, the maximum allowable transmission rate according to the instruction from the radio network controller RNC, and controlling, at the mobile station UE, a transmission rate of the uplink user data based on the reduced maximum allowable transmission rate.

3 Claims, 8 Drawing Sheets

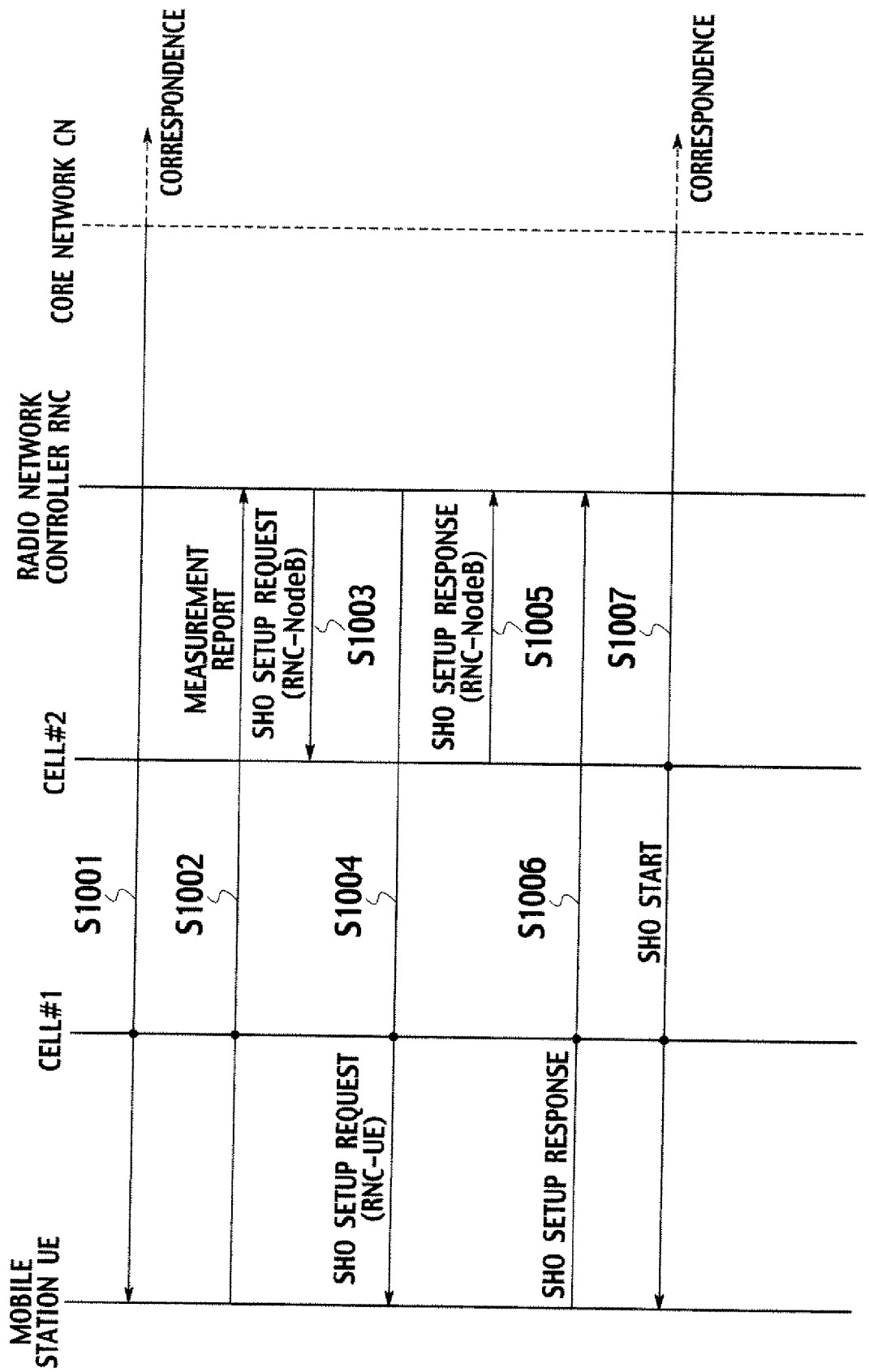

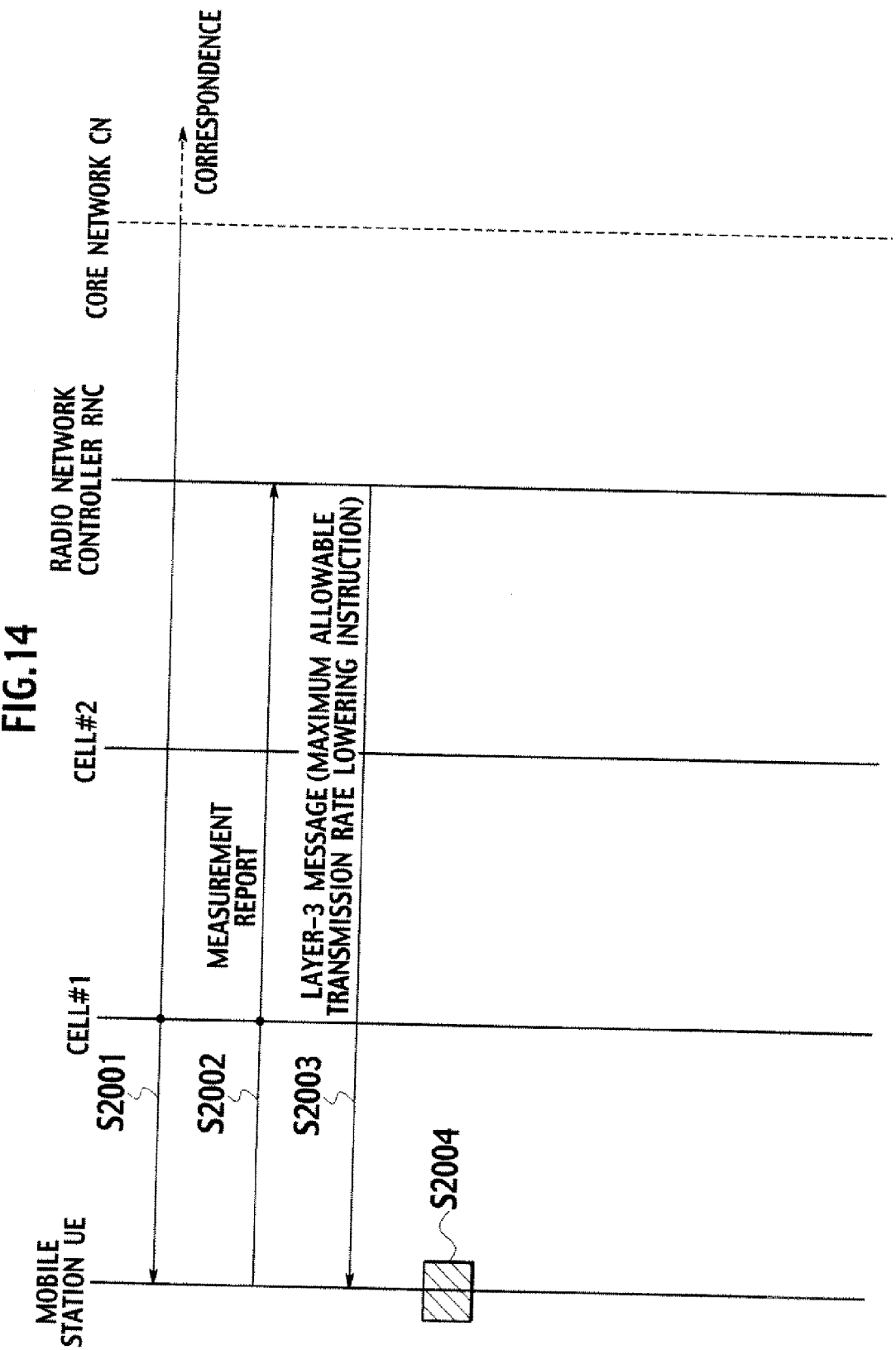

TRANSMISSION RATE CONTROL METHOD, MOBILE STATION, AND RADIO NETWORK CONTROLLER

CROSS REFERENCE TO RELATED APPLICATION

This application is based upon and claims the benefit of priority from the prior Japanese Patent Application No. P2005-055131, filed on Feb. 28, 2005; the entire contents of which are incorporated herein by reference.

BACKGROUND OF THE INVENTION

1. Field of the Invention

The present invention relates to transmission rate control methods, mobile stations, and radio network controllers, for controlling transmission rates of uplink user data.

2. Description of the Related Art

In a conventional mobile communication system, in an uplink from a mobile station UE to a radio base station Node B, a radio network controller RNC is configured to determine a transmission rate of a dedicated channel, in consideration of radio resources of the radio base station Node B, an interference volume in an uplink, transmission power of the mobile station UE, transmission processing performance of the mobile station UE, a transmission rate required for an upper application, and the like, and to notify the determined transmission rate of the dedicated channel by a message of a layer-3 (Radio Resource Control Layer) to both of the mobile station UE and the radio base station Node B.

Here, the radio network controller RNC is provided at an upper level of the radio base station Node B, and is an apparatus configured to control the radio base station Node B and the mobile station UE.

In general, data communications often cause burst traffic compared with voice communications or TV communications. Therefore, it is preferable that a transmission rate of a channel used for the data communications is changed fast.

However, as shown in FIG. 1, the radio network controller RNC integrally controls a plurality of radio base stations Node B in general. Therefore, in the conventional mobile communication system, there has been a problem that it is difficult to perform fast control for changing of the transmission rate of channel (for example, per approximately 1 through 100 ms), due to processing load, processing delay, or the like.

In addition, in the conventional mobile communication system, there has been also a problem that costs for implementing an apparatus and for operating a network are substantially increased even if the fast control for changing of the transmission rate of the channel can be performed.

Therefore, in the conventional mobile communication system, control for changing of the transmission rate of the channel is generally performed on the order from a few hundred ms to a few seconds.

Accordingly, in the conventional mobile communication system, when burst data transmission is performed as shown in FIG. 2(a), the data are transmitted by accepting low-speed, high-delay, and low-transmission efficiency as shown in FIG. 2(b), or, as shown in FIG. 2(c), by reserving radio resources for high-speed communications to accept that radio bandwidth resources in an unoccupied state and hardware resources in the radio base station Node B are wasted.

It should be noted that both of the above-described radio bandwidth resources and hardware resources are applied to the vertical radio resources in FIGS. 2(b) and 2(c).

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-i and a media access control (MAC) sub-layer (a layer-2) between the radio base station Node B and the mobile station UE, so as to utilize the radio resources effectively. Such discussions or discussed functions will be hereinafter referred to as "Enhanced Uplink (EUL)".

Radio resource control methods that have been discussed in the "Enhanced Uplink" can be broadly categorized into three as follows. The radio resource control methods will be briefly described below.

First, a radio resource control method that is referred to as "Time & Rate Control" has been discussed.

In such a radio resource control method, a radio base station Node B determines a mobile station UE which can transmit user data and a transmission rate of user data of the mobile station UE per a predetermined timing, so as to signal information relating to a mobile station ID as well as the transmission rate of user data (or a maximum allowable transmission rate of user data).

The mobile station UE that is designated by the radio base station Node B transmits user data at the designated timing and the transmission rate (or within a range of the maximum allowable transmission rate).

Second, a radio resource control method that is referred to as "Rate Control per UE" has been discussed.

In such a radio resource control method, if there is user data that should be transmitted to the radio base station Node B, each mobile station UE can transmit the user data. However, the maximum allowable transmission rate of the user data, which is determined by the radio base station Node B and signaled to each mobile station UE for each transmission frame or each of a plurality of transmission frames, is used.

Here, when the maximum allowable transmission rate is signaled, the radio base station Node B signals the maximum allowable transmission rate itself, or one of three values (e.g., Up/Down/Hold command) as a relative value of the maximum allowable transmission rate at this timing.

Third, a radio resource control method that is referred to as "Rate Control per Cell" has been discussed.

In such a radio resource control method, a radio base station Node B signals a transmission rate of user data, which is common among mobile stations UE in communication, or information needed to calculate the transmission rate, and each mobile station UE determines a transmission rate of user data based on the received information.

Ideally, the "Time & Rate Control", and the "Rate Control per UE" can be the best control methods for improving radio capacity in an uplink. However, a transmission rate of user data has to be granted after data volume stored in buffers of the mobile station UE, transmission power in the mobile station UE, or the like are grasped. Therefore, there has been a problem that control load is increased by the radio base station Node B.

In addition, in these radio resource control methods, there has been a problem that overhead becomes larger by exchanges of control signals.

On the other hand, in the "Rate Control per Cell", there is an advantage in that control load by the radio base station Node B is small since the radio base station Node B signals information which is common in cells, and each mobile station UE autonomously seeks the transmission rate of user data based on the received information.

However, the radio base station Node B has to be configured in such a manner that the user data in the uplink from any mobile station UE can be received. Therefore, there has been a problem that an apparatus size of radio base station Node B becomes large to effectively utilize the radio capacity of the uplink.

Accordingly, there has been proposed, for example, a scheme (Autonomous ramping method) that the mobile station UE increases the transmission rate of user data from a pre-notified initial transmission rate in accordance with pre-determined rules so that excessive allocation of radio capacity by the radio base station Node B can be prevented, thereby preventing increase of the apparatus size of radio base station Node B.

In such a scheme, a radio base station Node B determines a maximum allowable transmission rate (or parameters for the maximum allowable transmission rate. The same below.) based on hardware resources and radio bandwidth resources (for example, an interference volume in an uplink) in each cell, so as to control the transmission rate of user data in communicating mobile stations UE. Detailed descriptions of a control scheme based on hardware resources and a control scheme based on an interference volume in an uplink will be given below.

In the control scheme based on the hardware resources, a radio base station Node B is configured to signal a maximum allowable transmission rate to a mobile station UE connected to a cell under the control thereof.

The radio base station Node B lowers the maximum allowable transmission rate so as to avoid shortage of the hardware resources when the transmission rate of user data in the mobile station UE connected to the cell under the control thereof is increased and the hardware resources are insufficient.

On the other hand, the radio base station Node B again increases the maximum allowable transmission rate when the space of the hardware resources become larger at a time of completion of user data transmission in the mobile station UE connected to the cell under the control thereof, or the like.

In addition, in the control scheme based on the interference volume in the uplink, a radio base station Node B is configured to signal a maximum allowable transmission rate to a mobile station UE connected to a cell under the control thereof.

When the transmission rate of user data in the mobile station UE connected to the cell under the control of a radio base station Node B increases and a measured interference volume (for example, a measured noise rise) in the uplink exceeds an allowable value (for example, a maximum allowable noise rise), the radio base station Node B lowers the maximum allowable transmission rate so that the interference volume in the uplink can be within a range of the allowable value (see, FIG. 3).

On the other hand, when the interference volume (for example, the noise rise) in the uplink is within a range of the allowable value (for example, the maximum allowable noise rise), thereby having a space, at the time of completion of user data transmission in the mobile station UE connected to the cell under the control of the radio base station Node B, or the like, the radio base station Node B again increases the maximum allowable transmission rate (see, FIG. 3).

Also, it has been proposed that, as shown in FIG. 4, in a mobile communication system adopting the Autonomous ramping method, when a mobile station UE is performing a soft handover (SHO), a MAC-e function in a serving cell (e.g., cell #4) notifies the mobile station UE of a maximum allowable transmission rate of uplink user data, using an E-DCH Absolute rate Grant Channel (E-AGCH), and a MAC-e function in a non-serving cell (e.g., cell #3) instructs the mobile station UE to suppress a maximum allowable transmission rate by one of two types of commands, "Down command" or "Don't care command", using an E-DCH Relative rate Grant Channel (E-RGCH).

In this manner, a maximum allowable transmission rate of uplink user data at a mobile station UE performing a soft handover can be reduced to reduce interference, increasing transmission efficiency (throughput) in an entire cell.

However, in the conventional mobile communication system using the Autonomous ramping method, it is necessary for a mobile station UE to receive an E-RGCH from one or more cells at each Transmission Time Interval (TTI) and to control speedily in response to the received E-RGCH. This causes the problem of increased complexity of the mobile station UE.

BRIEF SUMMARY OF THE INVENTION

The present invention has been made in view of the above problem, and has an object of providing a transmission rate control method, a mobile station and a radio network controller which enable suppression of interference by a mobile station performing a soft handover to increase throughput in an entire cell, and also enable reduction in complexity of the mobile station.

A first aspect of the present invention is summarized as a transmission rate control method for controlling a transmission rate of uplink user data, including: notifying, at a radio base station, a mobile station of a maximum allowable transmission rate of the uplink user data, using an absolute rate grant channel; instructing, at a radio network controller, the mobile station to reduce the maximum allowable transmission rate, by layer-3 signaling; reducing, at the mobile station, the maximum allowable transmission rate according to the instruction from the radio network controller; and controlling, at the mobile station, the transmission rate of the uplink user data based on the reduced maximum allowable transmission rate.

In the first aspect, the radio network controller can instruct the mobile station to reduce the maximum allowable transmission rate in a soft handover setting request; and the mobile station can control the transmission rate of the uplink user data based on the reduced maximum allowable transmission rate when starting a soft handover.

A second aspect of the present invention is summarized as a mobile station for transmitting uplink user data, including: an absolute rate grant channel receiving section configured to receive an absolute rate grant channel transmitted from a radio base station, and to acquire a maximum allowable transmission rate of the uplink user data; a layer-3 signaling receiving section configured to receive layer-3 signaling from a radio network controller, and to detect an instruction to reduce the maximum allowable transmission rate; and a transmission rate control section configured to reduce the maximum allowable transmission rate according to the instruction from the radio network controller, and to control a transmission rate of the uplink user data based on the reduced maximum allowable transmission rate.

In the second aspect, the layer-3 signaling receiving section can be configured to detect the instruction to reduce the maximum allowable transmission rate from a soft handover setting request transmitted from the radio network controller; and the transmission rate control section can be configured to control the transmission rate of the uplink user data based on the reduced maximum allowable transmission rate when a soft handover is started.

A third aspect of the present invention is summarized as a radio network controller for use in a transmission rate control method for controlling a transmission rate of uplink user data, including: an instructing section configured to instruct a mobile station to reduce a maximum allowable transmission rate of the uplink user data notified by a radio base station using an absolute rate grant channel, by layer-3 signaling.

In the third aspect, the instructing section can be configured to instruct the mobile station to reduce the maximum allowable transmission rate in a soft handover setting request.

BRIEF DESCRIPTION OF THE SEVERAL VIEWS OF THE DRAWINGS

FIG. 13 is a sequence diagram showing operations of the mobile communication system according to the first embodiment of the present invention.

FIG. 14 is a sequence diagram showing operations of a mobile communication system according to modification 1 of the present invention.

DETAILED DESCRIPTION OF THE INVENTION (Mobile Communication System According to First Embodiment of the Present Invention)

Figure 1:
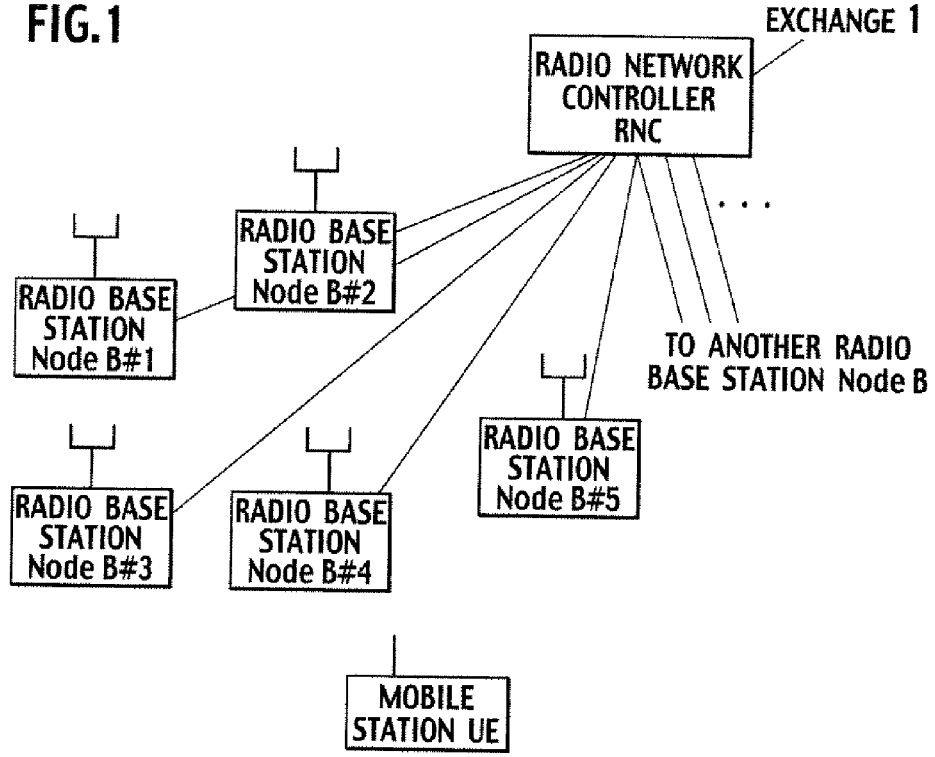
FIG. 1 is diagram of an entire configuration of a general mobile communication system.
Figure 2:
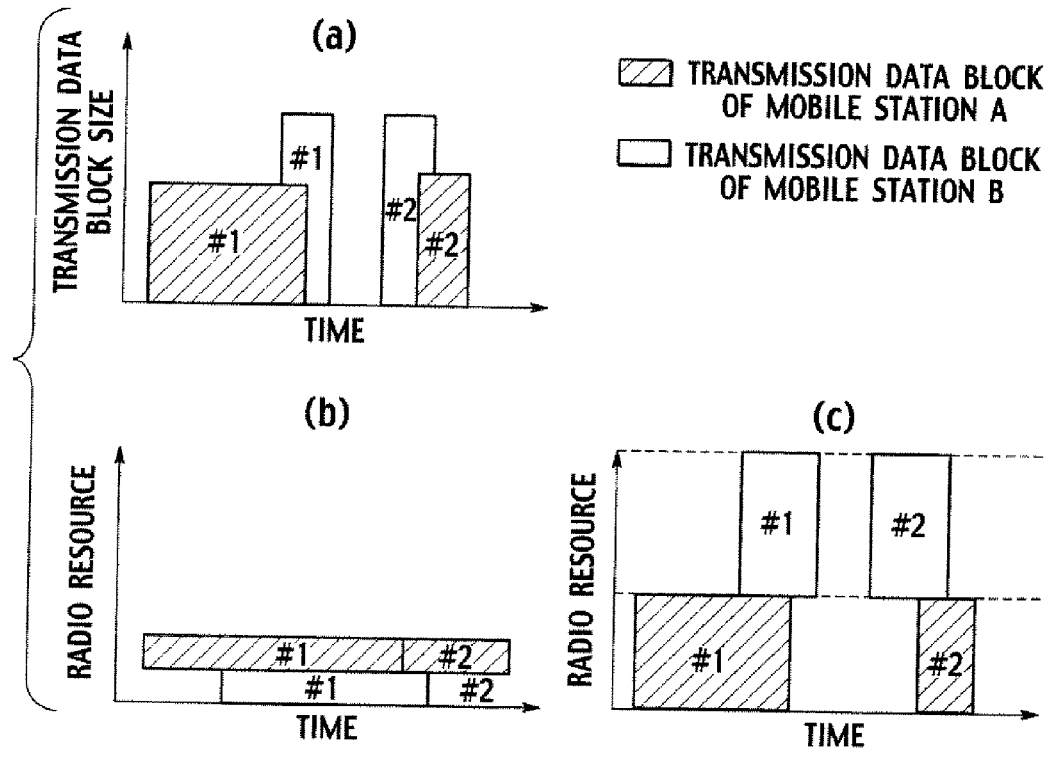
FIGS. 2(*a*) to (*c*) are graphs illustrating operations at the time of burst data transmission in a conventional mobile communication system.

Referring to FIGS. 5 to 12, a configuration of a mobile communication system according to a first embodiment of the present invention will be described. As shown in FIG. 1, the mobile communication system according to this embodiment is provided with a plurality of radio base stations Node B #1 to Node B #5 and a radio network controller RNC.

The mobile communication system according to this embodiment is configured to automatically increase the transmission rate of user data transmitted by a mobile station UE via an uplink to a maximum allowable transmission rate.

In addition, in the mobile communication system according to this embodiment, a "High Speed Downlink Packet Access (HSDPA)" is used in a downlink, and an "Enhanced Uplink (EUL)" is used in an uplink. It should be noted that in both of the HSDPA and the EUL, retransmission control (N process stop and wait) shall be performed by a "Hybrid Automatic Repeat Request (HARQ)".

Therefore, in an uplink, an "Enhanced Dedicated Physical Channel (E-DPCH)" configured of an "Enhanced Dedicated Physical Data Channel (E-DPDCH)" and an "Enhanced Dedicated Physical Control Channel (E-DPCCH)", and a "Dedicated Physical Channel (DPCH)" configured of a "Dedicated Physical Date Channel (DPDCH)" and a "Dedicated Physical Control Channel (DPCCH)" are used.

Here, the E-DPCCH transmits control data for the EUL such as a transmission format number for defining a transmission format (transmission block size, or the like) of the EDPDCH, HARQ related information (the number of retransmission, or the like), and scheduling related information (transmission power, buffer residence volume, or the like in the mobile station UE).

In addition, the E-DPDCH is paired with the E-DPCCH, and transmits uplink user data for the mobile station UE based on the control data for the EUL transmitted through the E-DPCCH.

The DPCCH transmits control data such as a pilot symbol that is used for RAKE combining, SIR measurement, or the like, a Transport Format Combination Indicator (TFCI) for identifying a transmission format of uplink DPDCH, and a downlink power control bit in a downlink.

In addition, the DPDCH is paired with the DPCCH, and transmits uplink user data for the mobile station UE based on the control data transmitted through the DPCCH. However, if uplink user data that should be transmitted does not exist in the mobile station UE, the DPDCH can be configured not to be transmitted.

In addition, in the uplink, a High Speed Dedicated Physical Control Channel (HS-DPCCH), which is needed when the HSPDA is applied, is also used.

The HS-DPCCH transmits a Channel Quality Indicator (CQI) measured in downlink and an HSDPA transmission acknowledge signal (Ack or Nack).

Figure 5:
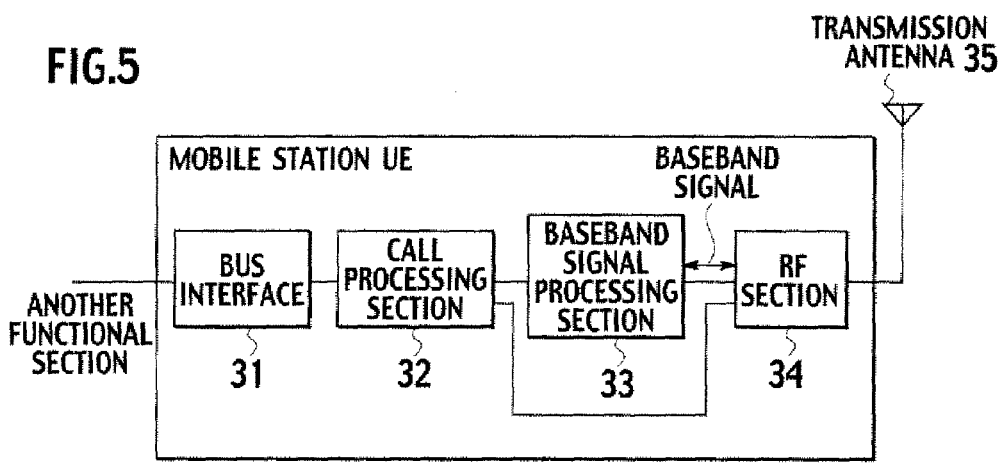
FIG. 5 is a functional block diagram of a mobile station in a mobile communication system according to a first embodiment of the present invention.

As shown in FIG. 5, the mobile station UE according to this embodiment is provided with a bus interface 31, a call processing section 32, a baseband processing section 33, a radio frequency (RF) section 34, and a transmission-reception antenna 35.

However, these functions can be independently present as hardware, and can be partly or entirely integrated, or can be configured through a process of software.

The bus interface 31 is configured to forward the user data output from the call processing section 32 to another functional section (for example, an application related functional section). In addition, the bus interface 31 is configured to forward the user data transmitted from another functional section (for example, the application related functional section) to the call processing section 32.

The call processing section 32 is configured to perform a call control processing for transmitting and receiving the user data.

The baseband signal processing section 33 is configured to transmit the user data to the call processing section 32, the user data acquired by performing, against the baseband signals transmitted from the RF section 34, a layer-1 processing including a despreading processing, a RAKE combining processing, and a "Forward Error Correction (FEC)" decode processing, a "Media Access Control (MAC)" processing including a MAC-e processing and a MAC-d processing, and a "Radio Link Control (RLC)" processing.

In addition, the baseband signal processing section 33 is configured to generate the baseband signals by performing the RLC processing, the MAC processing, or the layer-1 processing against the user data transmitted from the call processing section 32 so as to transmit the baseband signals to the RF section 34.

Detailed description of the functions of the baseband signal processing section 33 will be given later. The RF section 34 is configured to generate baseband signals by performing the detection processing, the filtering processing, the quantization processing, or the like against radio frequency signals received through the transmission—reception antenna 35, so as to transmit the generated baseband signals to the baseband signal processing section 33. In addition, the RF section 34 is configured to convert the baseband signals transmitted from the baseband signal processing section 33 to the radio frequency signals.

Figure 6:
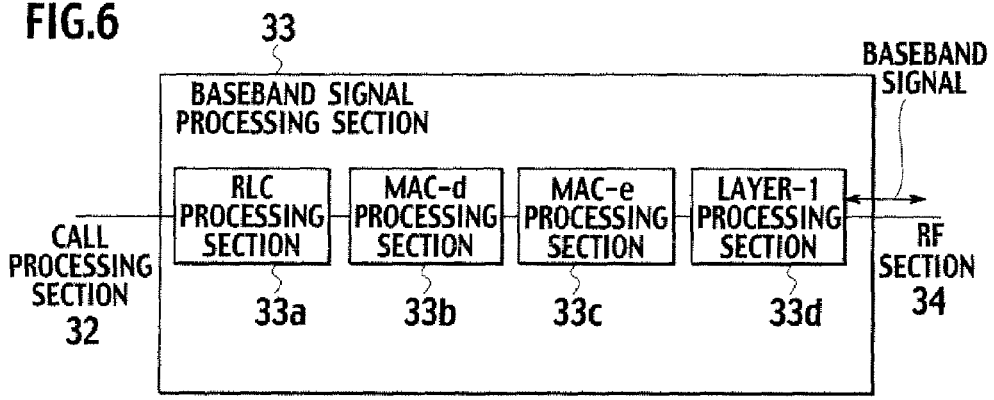
FIG. 6 is a functional block diagram of a baseband signal processing section of the mobile station in the mobile communication system according to the first embodiment of the present invention.

As shown in FIG. 6, the baseband signal processing section 33 is provided with a RLC processing section 33$a$, a MAC-d processing section 33$b$, a MAC-e processing section 33$c$, and a layer-1 processing section 33$d$.

The RLC processing section 33$a$ is configured to transmit, to the MAC-d processing section 33$b$, the user data transmitted from the call processing section 32 by performing a processing (RLC processing) in an upper layer of a layer-2 against the user data.

The MAC-d processing section 33$b$ is configured to add a channel identifier header based on a logical channel on which uplink user data has been transmitted, thereby creating a transmission format in the uplink.

Figure 7:
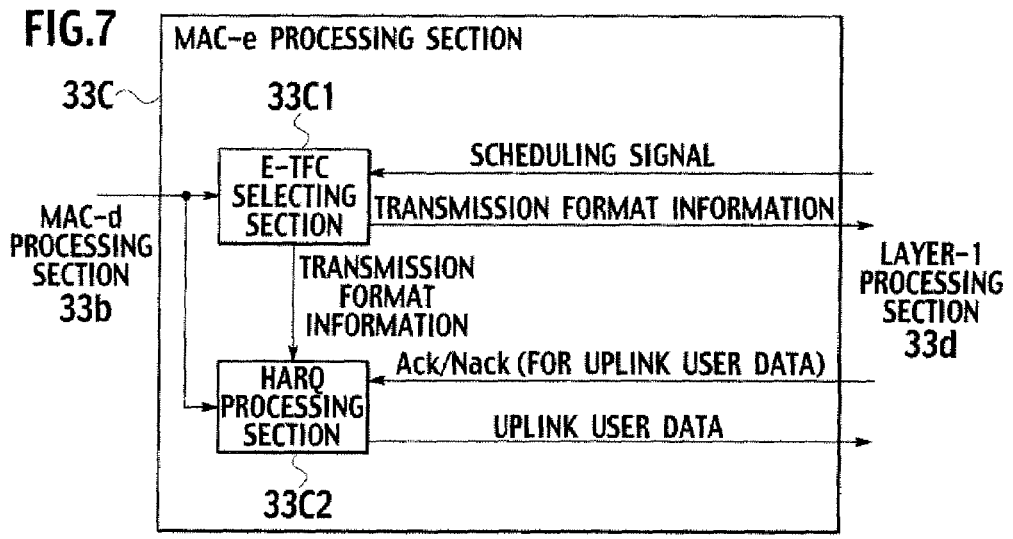
FIG. 7 is a functional block diagram of a MAC-e processing section of the baseband signal processing section in the mobile station of the mobile communication system according to the first embodiment of the present invention.

As shown in FIG. 7, the MAC-e processing section 33$c$ is provided with an Enhanced Transport Format Combination (E-TFC) selecting section 33$c1$ and an HARQ processing section 33$c2$.

The E-TFC selecting section 33$c1$ is configured to determine a transmission format (E-TFC) of the E-DPDCH, based on scheduling signals transmitted from the radio base station Node B.

In addition, the E-TFC selecting section 33$c1$ is configured to transmit transmission format information on the determined transmission format (that is, a transmission data block size, an transmission power ratio between the E-DPDCH and the DPCCH, or the like) to the layer-1 processing section 33$d$, and also to transmit the determined transmission data block size or the transmission power ratio to the HARQ processing section 33$c2$.

Here, the scheduling signals include an absolute value of the maximum allowable transmission rate of uplink user data in the mobile station UE transmitted by the E-AGCH (for example, the maximum allowable transmission data block size, a maximum value of the transmission power ratio between the E-DPDCH and the DPCCH (maximum allowable transmission power ratio).

Here, the E-TFC selecting section 33$c1$ is configured to control the transmission rate of uplink user data, based on a maximum allowable transmission rate notified by a scheduling signal from the radio base station Node B.

For example, the E-TFC selecting section 33$c1$ may increase the transmission rate of uplink user data up to the maximum allowable transmission rate notified by the scheduling signal from the radio base station Node B.

Also, the E-TFC selecting section 33$c1$ may transmit uplink user data at the maximum allowable transmission rate communicated by the scheduling signal from the radio base station Node B.

Unless particularly described in this specification, the maximum allowable transmission rate includes a parameter relating to the maximum allowable transmission rate.

Such a scheduling signal is information that is signaled in the cell where the mobile station UE is located, and includes control information for all the mobile stations located in the cell, or a specific group of the mobile stations located in the cell.

The HARQ processing section 33$c2$ is configured to perform process control for the "stop-and-wait of N-process", so as to transmit the uplink user data based on an acknowledge signal (Ack/Nack for uplink data) transmitted from the radio base station Node B.

Specifically, the HARQ 33$c2$ is configured to determine whether or not the receive processing of uplink user data by the radio base station Node B has been successful based on the acknowledge signal (Ack/Nack for uplink data) to be transmitted by the radio base station Node B.

Then, the HARQ processing section 33$c2$ is configured to transmit new data on the HARQ process if the received acknowledge signal to the HARQ process from the radio base station Node B was an Ack (data was successfully received), or to retransmit data on the HARQ process if the received acknowledge signal to the HARQ process from the radio base station Node B was a Nack (data was not successfully received).

Figure 8:
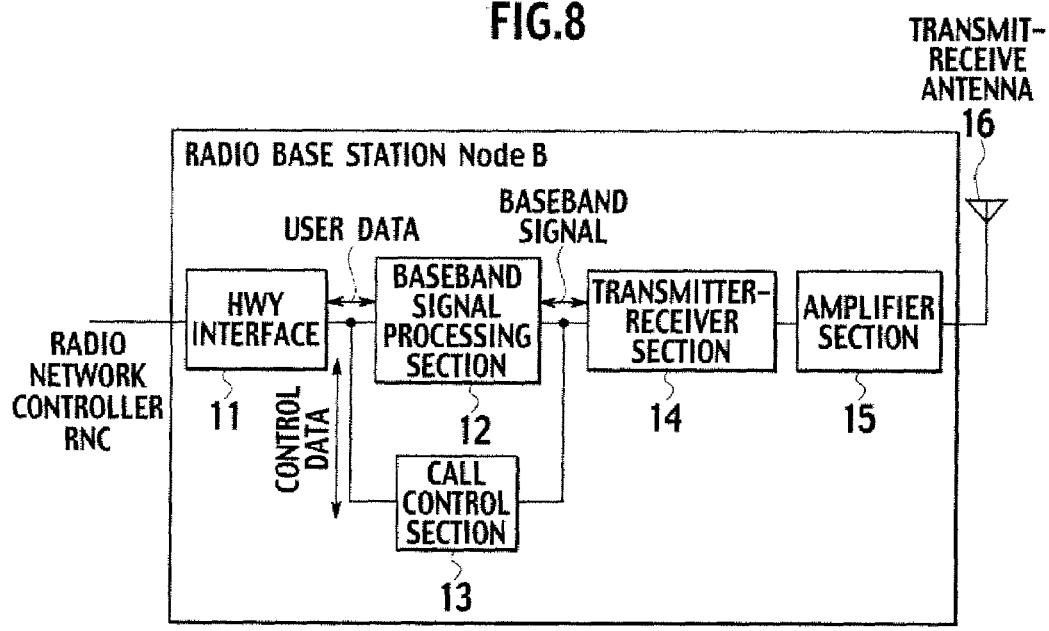
FIG. 8 is a functional block diagram of a radio base station of the mobile communication system according to the first embodiment of the present invention.

As shown in FIG. 8, the radio base station Node B according to this embodiment is provided with an HWY interface 11, a baseband signal processing section 12, a call control section 13, at least one transmitter-receiver section 14, at least one amplifier section 15, and at least one transmission-reception antenna 16.

The HWY interface 11 is an interface with a radio network controller RNC. Specifically, the HWY interface 11 is configured to receive user data transmitted from the radio network controller RNC to a mobile station UE via a downlink, so as to enter the user data to the baseband signal processing section 12. In addition, the HWY interface 11 is configured to receive control data for the radio base station Node B from the radio network controller RNC, so as to enter the received control data to the call control section 13.

In addition, the HWY interface 11 is configured to acquire, from the baseband signal processing section 12, the user data included in the uplink signals which are transmitted from a mobile station UE via an uplink, so as to transmit the acquired user data to the radio network controller RNC.

Further, the HWY interface 11 is configured to acquire the control data for the radio network controller RNC from the call control section 13, so as to transmit the acquired control data to the radio network controller RNC.

The baseband signal processing section 12 is configured to generate baseband signals by performing the MAC-e processing or the layer-1 processing against the downlink user data acquired from the HWY interface 11, so as to forward the generated baseband signals to the transmitter-receiver section 14.

Here, the MAC-e processing in the downlink includes an HARQ processing, a scheduling processing, a transmission rate control processing, or the like. In addition, the layer-1 processing includes a channel coding processing of user data, a spreading processing, or the like.

In addition, the baseband signal processing section 12 is configured to extract uplink user data by performing the layer-1 processing or the MAC-e processing against the baseband signals acquired from the transmitter-receiver section 14, so as to forward the extracted user data to the HWY interface 11.

Here, the MAC-e processing in the uplink includes the HARQ processing, the scheduling processing, the transmission rate control processing, a header disposal processing, or the like. In addition, the layer-1 processing in the uplink includes the despreading processing, the RAKE combining processing, the error correction decode processing, or the like.

Detailed description of the functions of the baseband signal processing section 12 will be given later. In addition, the call control section 13 is configured to perform the call control processing, based on the control data acquired from the HWY interface 11.

The transmitter-receiver section 14 is configured to perform processing of converting baseband signals, which are acquired from the baseband signal processing section 12, to radio frequency signals (downlink signals), so as to transmit the converted radio frequency signals to the amplifier section 15. In addition, the transmitter-receiver 14 is configured to perform processing of converting the radio frequency signals (uplink signals), which are acquired from the amplifier section 15, to the baseband signals, so as to transmit the converted baseband signals to the baseband signal processing section 12.

The amplifier section 15 is configured to amplify the downlink signals acquired from the transmitter-receiver section 14, so as to transmit the amplified downlink signals to the mobile station UE via the transmission-reception antenna 16. In addition, the amplifier 15 is configured to amplify the uplink signals received by the transmission-reception antenna 16, so as to transmit the amplified uplink signals to the transmitter-receiver section 14.

Figure 9:
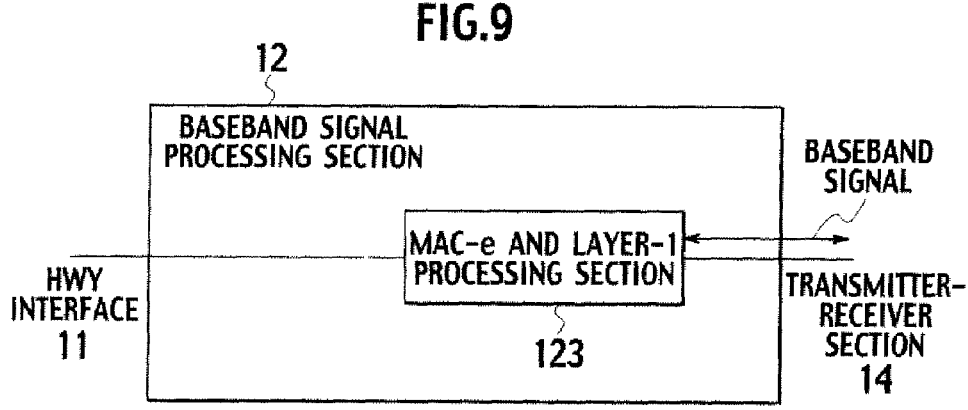
FIG. 9 is a functional block diagram of a baseband signal processing section in the radio base station of the mobile communication system according to the first embodiment of the present invention.

As shown in FIG. 9, the baseband signal processing section 12 is provided with a MAC-e and layer-1 processing section 123.

The MAC-e and layer-1 processing section 123 is configured to perform, against the baseband signals acquired from the transmitter-receiver section 14, the despreading processing, the RAKE combining processing, the error correction decode processing, the HARQ processing, or the like.

However, these functions are not clearly divided per hardware, and can be obtained by software.

Figure 10:
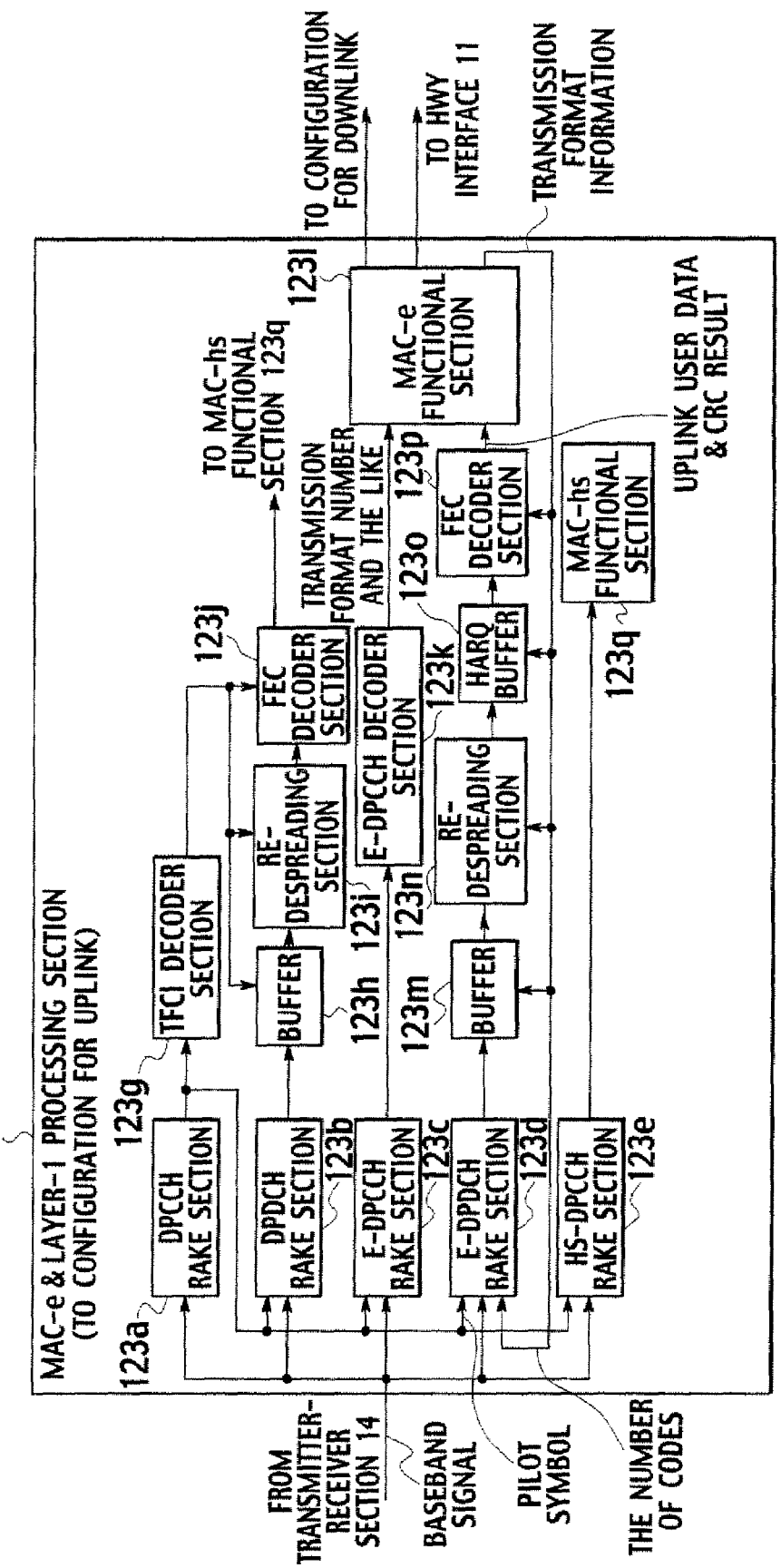
FIG. 10 is a functional block diagram of a MAC-e and layer-1 processing section (configured for an uplink) in the baseband signal processing section in the radio base station of the communication system according to the first embodiment of the present invention.

As shown in FIG. 10, the MAC-e and layer-1 processing section (configuration for the uplink) 123 is provided with a DPCCH RAKE section 123*a*, a DPDCH RAKE section 123*b*, an E-DPCCH RAKE section 123*c*, an E-DPDCH RAKE section 123*d*, an HS-DPCCH RAKE section 123*e*, a TFCI decoder section 123*g*, buffers 123*h* and 123*m*, re-despreading sections 123*i* and 123*n*, FEC decoder sections 123*j* and 123*p*, an E-DPCCH decoder section 123*k*, a MAC-e functional section 123*l*, an HARQ buffer 123*o*, and a MAC-hs functional section 123*q*.

The E-DPCCH RAKE section 123*c* is configured to perform, against the E-DPCCH in the baseband signals transmitted from the transmitter-receiver section 14, the despreading processing and the RAKE combining processing using a pilot symbol included in the DPCCH.

The E-DPCCH decoder section 123*k* is configured to acquire transmission format number related information, HARQ related information, scheduling related information, or the like, by performing the decode processing against the RAKE combining outputs of the E-DPCCH RAKE section 123*c*, so as to enter the information to the MAC-e functional section 123*l*.

The E-DPDCH RAKE section 123*d* is configured to perform, against the E-DPDCH in the baseband signals transmitted from the transmitter-receiver section 14, the despreading processing using the transmission format information (the number of codes) transmitted from the MAC-e functional section 123*l* and the RAKE combining processing using the pilot symbol included in the DPCCH.

The buffer 123*m* is configured to store the RAKE combining outputs of the E-DPDCH RAKE section 123*d* based on the transmission format information (the number of symbols) transmitted from the MAC-e functional section 123*l*.

The re-despreading section 123*n* is configured to perform the despreading processing against the RAKE combining outputs of the E-DPDCH RAKE section 123*d*, based on the transmission format information (spreading factor) transmitted from the MAC-e functional section 123*l*.

The HARQ buffer 123*o* is configured to store the despreading processing outputs of the re-despreading section 123*n*, based on the transmission format information transmitted from the MAC-e functional section 123*l*.

The FEC decoder section 123*p* is configured to perform an error correction decoding processing (the FEC decoding processing) against the despreading processing outputs of the re-despreading section 123*n*, which is stored in the HARQ buffer 123*o*, based on the transmission format information (transmission data block size) transmitted from the MAC-e functional section 123*l*.

The MAC-e functional section 123*l* is configured to calculate and output the transmission format information (the number of codes, the number of symbols, spreading factor, transmission data block size, and the like) based on the transmission format number related information, the HARQ related information, the scheduling related information, and the like, which are acquired from the E-DPCCH decoder section 123*k*.

Figure 11:
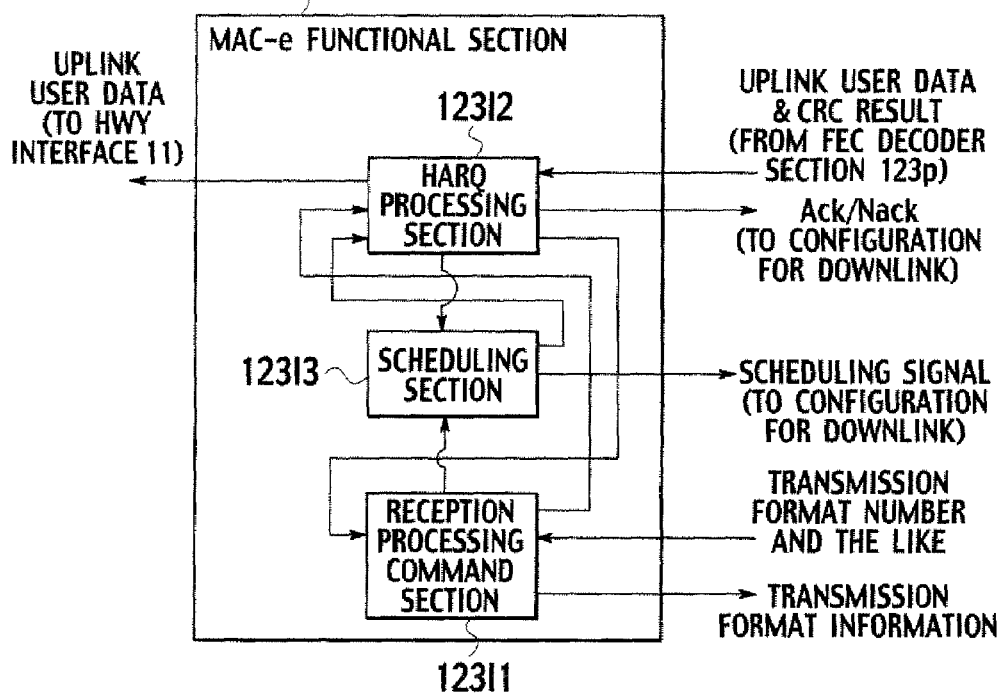
FIG. 11 is a functional block diagram of the MAC-e functional section of the MAC-e and layer-1 processing section (configured for the uplink) in the baseband signal processing section in the radio base station of the mobile communication system according to the first embodiment of the present invention.

In addition, as shown in FIG. 11, the MAC-e functional section 123*l* is provided with a receive processing command section 123/1, an HARQ processing section 123/2, and a scheduling section 123/3.

The receive processing command section 123/1 is configured to transmit the transmission format number related information, the HARQ related information, and the scheduling related information, which are entered from the E-DPCCH decoder section 123, to the HARQ processing section 123/2.

In addition, the receive processing command section 123/1 is configured to transmit, to the scheduling section 123/3, the scheduling related information entered from the E-DPCCH decoder 123*k*.

Further, the receive processing command section 123/1 is configured to output the transmission format information corresponding to the transmission format number entered from the E-DPCCH decoder section 123*k*.

The HARQ processing section 123/2 is configured to determine whether or not the receive processing of uplink user data has been successful, based on the CRC result entered from the FEC decoder section 123*p*. Then, the HARQ processing section 123/2 is configured to generate an acknowledge signal (Ack or Nack), based on the determination result, so as to transmit the generated acknowledge signal to the configuration for the downlink of the baseband signal processing section 12. In addition, the HARQ processing section 123/2 is configured to transmit the uplink user data entered from the FEC decoder section 123*p* to the radio network controller RNC, when the above determination result has been successful.

In addition, the HARQ processing section 123/2 is configured to clear soft decision values stored in the HARQ buffer 123*o*, when the above determination result has been successful. On the other hand, the HARQ processing section 123/2 is configured to store, in the HARQ buffer 123*o*, the uplink user data, when the above determination result has not been successful.

In addition, the HARQ processing section 123/2 is configured to forward the above determination result to the receive processing command section 123/1. The receive processing command section 123/1 is configured to notify the E-DPDCH RAKE section 123*d* and the buffer 123*m* of an hardware resource that should be prepared for the following transmission time interval (TTI), so as to perform notification for reserving the resource in the HARQ buffer 123*o*.

In addition, when the uplink user data is stored in the buffer 123*m*, the receive processing command section 123/1 instructs the buffer 123*m* and the FEC decoder section 123*p* to perform the FEC decoding processing after adding the uplink user data, which is stored in the HARQ buffer 123*o*, in a process corresponding to the TTI and a newly received uplink user data, per TTI.

In addition, the scheduling section 123/3 is configured to designate the configuration for the downlink of the baseband signal processing section 12 so as to transmit the scheduling signals including the maximum allowable transmission rate (maximum allowable transmission data block size, maximum allowable transmission power ratio, or the like), based on radio resources in the uplink of the radio base station Node B, interference volume (noise rise) in the uplink, or the like.

Specifically, the scheduling section 123/3 is configured to determine the maximum allowable transmission rate based on the scheduling related information (radio resources in the uplink) transmitted from the E-DPCCH decoder section 123*k* or the interference volume in the uplink transmitted from the interference power measurement section 123*r*, so as to control the transmission rate of uplink user data in a communicating mobile station in communication.

Detailed descriptions of a control method based on the hardware resources and a control method based on the interference volume in the uplink will be given below.

In the control method based on the hardware resources, the scheduling section 123/3 is configured to signal the maximum allowable transmission rate through the E-AGCH to the mobile station UE connected to a cell under the control of the radio base station Node B.

When the transmission rate of uplink user data in the mobile station UE connected to the cell under the control of the radio base station Node B increases and the hardware resources becomes insufficient, the scheduling section 123/3 lowers the maximum allowable transmission rate so that shortage of the hardware resources will not be caused.

On the other hand, when the hardware resources have spaces in such a case when the uplink user data transmission in the mobile station UE connected to the cell under the control of the radio base station Node B is completed, or the like, the scheduling section 123/3 again increases the maximum allowable transmission rate.

In addition, in the control method based on the interference volume in the uplink, the scheduling section 123/3 is configured to signal the maximum allowable transmission rate through the E-AGCH to the mobile station UE connected to the cell under the control of the radio base station Node B.

Figure 3:
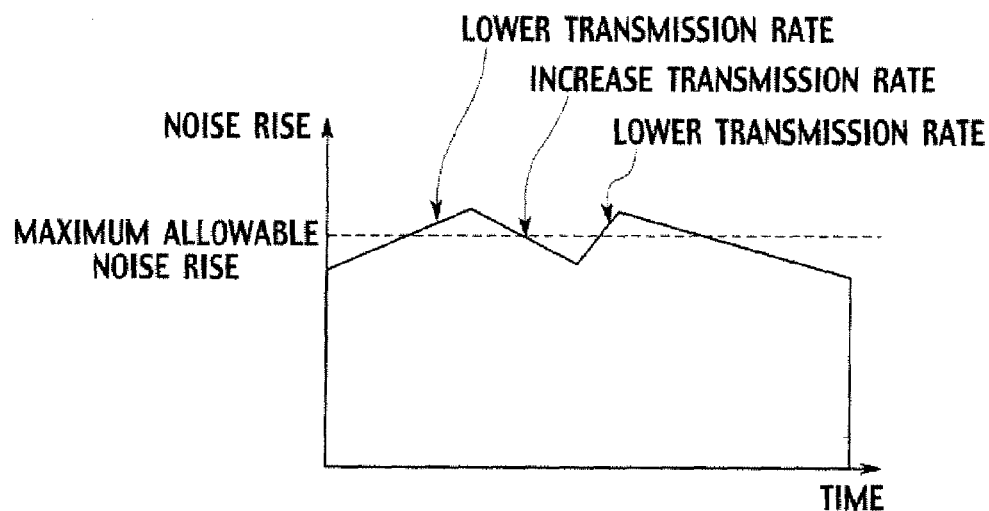
FIG. 3 is a graph illustrating operations at the time of controlling transmission rate in an uplink in the conventional mobile communication system.
Figure 4:
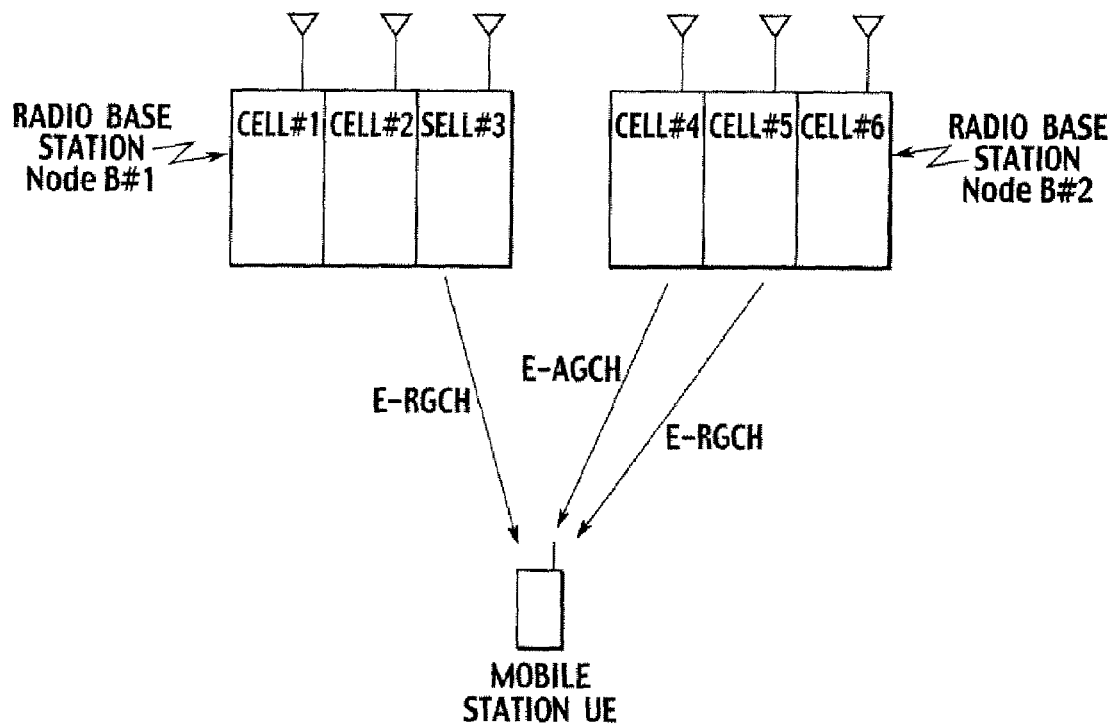
FIG. 4 is a diagram showing an example of a channel transmitted by a radio base station in a conventional mobile communication system.

When the transmission rate of uplink user data in the mobile station UE connected to the cell under the control of the radio base station Node B increases and the interference volume (for example, noise rise) in the uplink exceeds an allowable value (for example, maximum allowable noise rise), the scheduling section 123/3 lowers the maximum allowable transmission rate so that the interference volume in the uplink can fall within a range of the allowable value (see, FIG. 3).

On the other hand, when the interference volume (for example, noise rise) in the uplink falls within the range of the allowable value (for example, maximum allowable noise rise) and there is a space therein in the case when the uplink user data transmission in the mobile station UE connected to the cell under the control of the radio base station Node B is completed, or the like, the scheduling section 123/3 again increases the maximum allowable transmission rate (see, FIG. 3).

Also, the scheduling section 123/3 is configured to set a priority class for each logical channel used when the mobile station UE transmits uplink user data.

Then, the scheduling section 123/3 determines an absolute value of the maximum allowable transmission rate of uplink user data for each priority class, and transmits a scheduling signal including the absolute value of the maximum allowable transmission rate for each priority class and a priority class ID for identifying a priority class to the downlink configuration of the baseband signal processing section 12.

The radio network controller RNC according to this embodiment is an apparatus located in an upper level of the radio base station Node B, and is configured to control radio communications between the radio base station Node B and the mobile station UE.

Figure 12:
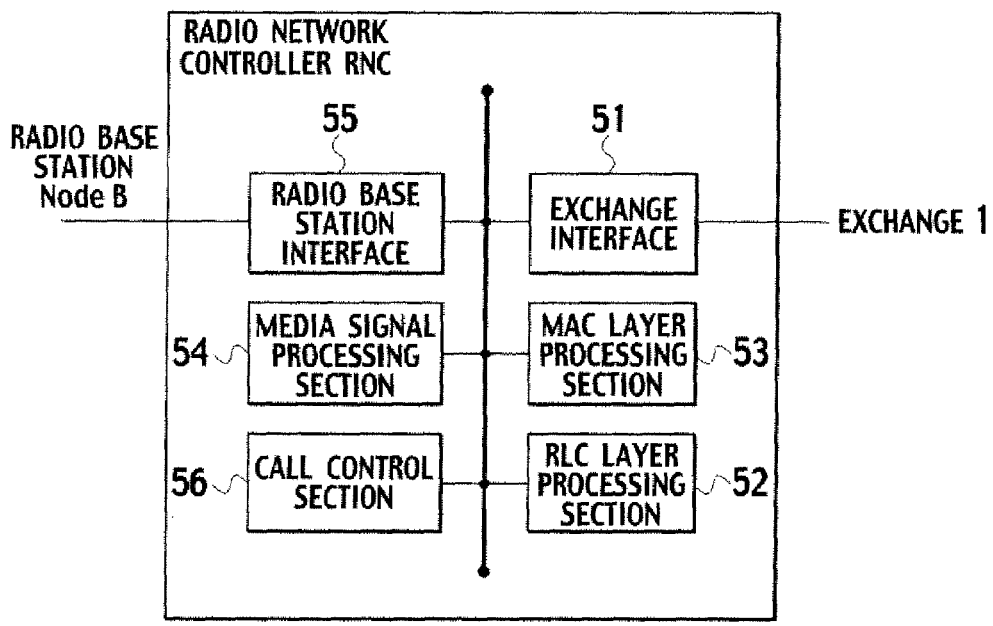
FIG. 12 is a functional block diagram of a radio network controller of the mobile communication system according to the first embodiment of the present invention.

As shown in FIG. 12, the radio network controller RNC according to this embodiment is provided with an exchange interface 51, an RLC layer processing section 52, a MAC layer processing section 53, a media signal processing section 54, a radio base station interface 55, and a call control section 56.

The exchange interface 51 is an interface with an exchange 1, and is configured to forward the downlink signals transmitted from the exchange 1 to the RLC layer processing section 52, and to forward the uplink signals transmitted from the RLC layer processing section 52 to the exchange 1.

The RLC layer processing section 52 is configured to perform a Radio Link Control (RLC) sub-layer processing such as a synthesis processing of a header such as a sequence number or a trailer. The RLC layer processing section 52 is also configured to transmit the uplink signals to the exchange interface 51 and to transmit the downlink signals to the MAC layer processing section 53, after the RLC sub-layer processing is performed.

The MAC layer processing section 53 is configured to perform a MAC layer processing such as a priority control processing or a header granting processing. The MAC layer processing section 53 is also configured to transmit the uplink signals to the RLC layer processing section 52 and to transmit the downlink signals to the radio base station interface 55 (or a media signal processing section 54), after the MAC layer processing is performed.

The media signal processing section 54 is configured to perform a media signal processing against voice signals or real time image signals. The media signal processing section 54 is also configured to transmit the uplink signals to the MAC layer processing section 53 and to transmit the downlink signals to the radio base station interface 55, after the media signal processing is performed.

The radio base station interface 55 is an interface with the radio base station Node B. The radio base station interface 55 is configured to forward the uplink signals transmitted from the radio base station Node B to the MAC layer processing section 53 (or the media signal processing section 54) and to forward the downlink signals transmitted from the MAC layer processing section 53 (or the media signal processing section 54) to the radio base station Node B.

The call control section 56 is configured to perform a radio resource control processing, a channel setup and open processing by the layer-3 signaling, or the like. Here, the radio resource control includes call admission control and handover control.

The call control section 56 is configured to instruct the mobile station UE, by the layer-3 signaling, to reduce the maximum allowable transmission rate of uplink user data notified by the radio base station Node B using the E-AGCH.

For example, the call control section 56 may instruct the mobile station UE to reduce the maximum allowable transmission rate of uplink user data in a soft handover setting request.

In this case, the call control section 56 is configured to perform call admission control in each cell, using a layer-3 message.

Specifically, the call control section 56 may be configured to perform call admission control in each cell by instructing mobile stations UE under each cell to reduce the maximum allowable transmission rate of uplink user data, based on QoS of each call, traffic conditions (such as the total reception transmission rate of logical channels) in each cell, or communication conditions (such as total receive power) in each cell.

With reference to FIG. 13, operation of the mobile communication system according to the first embodiment of the present invention will be described.

As shown in FIG. 13, in step S1001, the mobile station UE is in communication with a correspondence via the cell #1, the radio network controller RNC and the core network.

Here, the mobile station UE controls the transmission rate of uplink user data, based on an absolute value of the maximum transmission rate notified by the E-AGCH transmitted from the serving cell #1 of the mobile station UE, a relative value of the maximum transmission rate notified by the E-RGCH transmitted from the serving cell #1 of the mobile station UE, and a relative value of the maximum transmission rate notifited by the E-RGCH transmitted from the non-serving cell #2 of the mobile station UE.

The serving cell #1 of the mobile station UE may transmit a common E-AGCH to mobile stations UE under the serving cell #1, or may transmit different E-AGCHs to mobile stations UE under the serving cell #1.

In this embodiment, suppose that the serving cell #1 of the mobile station UE transmits a common E-AGCH to mobile stations UE under the serving cell #1.

The serving cell #1 and the non-serving cell #2 of the mobile station UE may transmit a common E-RGCH to mobile stations UE under the serving cell #1 and the non-serving cell #2, or may transmit different E-RGCHs to mobile stations UE under the serving cell #1 and the non-serving cell #2.

In this embodiment, suppose that the serving cell #1 and the non-serving cell #2 of the mobile station UE transmit a common E-RGCH to mobile stations UE under the serving cell #1 and the non-serving cell #2.

In step S1002, when receive power from the cell #2 (e.g., reception power of a common pilot channel from the cell #2) becomes strong, the mobile station UE transmits a measurement report to the radio network controller RNC.

Receiving the measurement report, in step S1003, the radio network controller RNC transmits, to the cell #2, a soft handover (SHO) setup request (RNC-Node B) for a link between the radio network controller RNC and the radio base station Node B, and in step S1004, transmits, to the mobile station UE, a soft handover (SHO) setup request (RNC-UE) for a link between the radio network controller RNC and the mobile station UE.

In the soft handover (SHO) setup request (RNC-UE), the radio network controller RNC instructs the mobile station UE to reduce the maximum allowable transmission rate of uplink user data notified by the radio base station Node B using the E-AGCH.

In step S1005, the cell #2 transmits a soft handover (SHO) setup response to the soft handover (SHO) setup request (RNC-Node B); and in step S1006, the mobile station UE transmits a soft handover (SHO) setup response to the soft handover (SHO) setup request.

Here, the mobile station UE multiplies the maximum allowable transmission rate of uplink user data notified by the radio base station Node B using the E-AGCH by the degree of reduction specified by the radio network controller RNC, thereby determining the maximum allowable transmission rate of uplink user data at the start of a soft handover of the mobile station UE.

Here, the mobile station UE controls the uplink user data transmission rate, based on the determined maximum allowable transmission rate of uplink user data.

For example, the mobile station UE may increase the uplink user data transmission rate straightly to the maximum allowable transmission rate of uplink user data, or may increase the uplink user data transmission rate gradually.

In step S1007, the mobile station UE enters a soft handover state between the cell #1 and the cell #2 at a timing notified by the radio network controller RNC.

For example, when "1 Mbps" is notified in the E-AGCH as the maximum allowable transmission rate of uplink user data, and the reduction degree is "80%", the maximum allowable transmission rate of uplink user data at the start of a soft handover of the mobile station UE is "800 kbps".

The mobile station UE then maintains the reduction degree "80%" until instructed to reduce the maximum allowable transmission rate of uplink user data from the radio network controller RNC, and multiplies the maximum allowable transmission rate notified by the E-AGCH by the reduction degree to determine the maximum allowable transmission rate of uplink user data at the start of a soft handover of the mobile station UE accordingly.

The reduction degree of maximum allowable transmission rate of uplink user data specified from the radio network controller RNC may be specified by a percentage (%) to the maximum allowable transmission rate of uplink user data as described above, or may be specified by an upper limit of the maximum allowable transmissions rate of uplink user data.

According to the mobile communication system in this embodiment, even when an E-AGCH and an E-RGCH transmitted in each cell are shared, the radio network controller RNC can control uplink user data transmission rates of mobile stations UE separately, using layer-3 messages.

(Modification 1)

With reference to FIG. 14, operation of a mobile communication system according to modification 1 of the above-described first embodiment will be described.

As shown in FIG. 14, in step S2001, the mobile station UE is in communication with a communicating party via a cell #1, a radio network controller RNC, and a core network.

In step S2002, when reception power from a cell #2 (e.g., reception power of a common pilot channel from the cell #2) becomes strong, the mobile station UE transmits a measurement report to the radio network controller RNC.

Receiving the measurement report, in step S2003, the radio network controller RNC instructs the mobile station UE to reduce the maximum allowable transmission rate of uplink user data by transmitting a layer-3 message (that is, by layer-3 signaling) without transmitting a soft handover setup request.

In step S2004, the mobile station UE multiplies the maximum allowable transmission rate of uplink user data notified by the radio base station Node B using an AGCH by the degree of reduction specified from the radio network controller RNC, thereby updating the maximum allowable transmission rate of uplink user data.

Consequently, it is also possible to make a mobile station UE not performing a soft handover reduce the maximum allowable transmission rate of uplink user data at the mobile station UE coming close to a neighboring cell, thereby to eliminate instability in lower layer signals due to soft handover and increase radio capacity in uplink.

The present invention can provide a transmission rate control method, a mobile station and a radio network controller which enable suppression of interference by a mobile station performing a soft handover to increase throughput in an entire cell, and also enable reduction in complexity of the mobile station.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A transmission rate control method for controlling a transmission rate of uplink user data, comprising:

controlling, at a mobile station, the transmission rate of the uplink user data based on a maximum allowable transmission rate notified by an absolute rate grant channel and/or a command notified by a relative rate grant channel, when the mobile station is not in a soft handover;

notifying, at a radio network controller, the mobile station of a maximum allowable transmission rate, by a soft handover setting request;

controlling, at the mobile station, the transmission rate of the uplink user data based on the maximum allowable transmission rate notified by the soft handover setting request, after the mobile station starts a soft handover and before the mobile station receives at least one of: a maximum allowable transmission rate via an absolute rate grant channel from a serving cell for the mobile station, and a command notified by a relative rate grant channel; and controlling, at the mobile station, the transmission rate of the uplink user data based on at least one of: the maximum allowable transmission rate notified by the absolute rate grant channel, and the command notified by the relative rate grant channel from the serving cell, when the mobile station is in a soft handover.

2. The transmission rate control method as set forth in claim 1, wherein:

a non-serving cell for the mobile station does not transmit a relative rate grant channel for instructing the mobile station to suppress the maximum allowable transmission rate, when the mobile station is in a soft handover.

3. A mobile station for transmitting uplink user data, comprising:

a receiving section configured to receive an absolute rate grant channel and/or a relative rate grant channel transmitted from a radio base station;

a layer-3 signaling receiving section configured to receive layer-3 signaling from a radio network controller; and a transmission rate control section configured to control a transmission rate of the uplink user data; wherein, the transmission rate control section is configured to control the transmission rate of the uplink user data based on a maximum allowable transmission rate notified by the received absolute rate grant channel and/or a command notified by the received relative rate grant channel, when the mobile station is not in a soft handover;

the transmission rate control section is configured to control the transmission rate of the uplink user data based on a maximum allowable transmission rate notified by a soft handover setting request as the layer-3 signaling, after the mobile station starts a soft handover and before the mobile station receives a maximum allowable transmission rate via an absolute rate grant channel from a serving cell for the mobile station; and the transmission rate control section is configured to control the transmission rate of the uplink user data based on the maximum allowable transmission rate notified by the absolute rate grant channel from the serving cell, when the mobile station is in a soft handover.

* * * * *